(12) United States Patent
McLandrich

(10) Patent No.: US 6,169,832 B1
(45) Date of Patent: Jan. 2, 2001

(54) SYSTEM FOR GENERATING A WAVELENGTH STABILIZED OUTPUT FROM A SUPERLUMINESCENT DIODE

(75) Inventor: Matthew N. McLandrich, San Diego, CA (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 09/107,171

(22) Filed: Jun. 17, 1998

(51) Int. Cl.[7] ........................................ G02B 6/26
(52) U.S. Cl. ........................ 385/43; 385/33; 385/51; 372/6
(58) Field of Search .................. 385/43, 51, 33; 357/17; 372/6, 28, 32; 356/350

(56) References Cited

U.S. PATENT DOCUMENTS

| | | | |
|---|---|---|---|
| 4,243,297 | * 1/1981 | Elion | 350/96.15 |
| 4,753,497 | * 6/1988 | Fujii et al. | 350/96.15 |
| 5,121,453 | * 6/1992 | Orazi et al. | 385/51 |
| 5,126,803 | * 6/1992 | Hagar et al. | 357/17 |
| 5,148,508 | * 9/1992 | Anjan et al. | 385/51 |
| 5,355,381 | * 10/1994 | Leilabady | 372/28 |
| 5,598,493 | * 1/1997 | Bonham, Jr. et al. | 385/33 |

\* cited by examiner

Primary Examiner—Cassandra Spyrou
Assistant Examiner—Craig Curtis
(74) Attorney, Agent, or Firm—Harvey Fendelman; Peter A. Lipovsky; Michael A. Kagan

(57) ABSTRACT

A system is described which generates a wavelength stabilized output from a superluminescent diode. The system may be implemented whereby a superluminescent diode injects an optical signal into a conically tapered optical fiber fused to an optical fiber polarization independent wavelength division multiplexing (PINC WDM) coupler. The PINC WDM coupler transforms the optical signal into an optical signal which is wavelength stabilized with respect to temperature.

18 Claims, 13 Drawing Sheets

SYSTEM FOR GENERATING A WAVELENGTH STABILIZED OUTPUT FROM A SUPERLUMINESCENT DIODE

The present invention relates to superluminescent diodes, and more particularly to a system for generating a wavelength stabilized output from a superluminescent diode using a narrow channel wavelength division multiplexer coupler.

BACKGROUND OF THE INVENTION

Superluminescent diodes (SLD) are candidates for use as the light source in interferometric fiber optic gyroscopes (IFOG), where a relatively broadband, low-coherence, and high optical power fiber-coupled source is desired. The wavelength-operating region of the SLD can be in any of several different wavelength regions, but recent efforts have focused on the 1550 nm region. For effective operation in an IFOG, the light source must also exhibit a relatively stable and predictable optical spectrum over a wide temperature range, typically from −55 to +80° C. IFOG applications require a light source thermal sensitivity on the order of 5 parts per million per degree Celsius (ppm/° C.). The inherent temperature sensitivity of the mean wavelength of a typical SLD is on the order of 400 to 500 ppm/° C., which is too large for it to be used in navigation grade IFOGs even when thermoelectric cooling devices and other temperature compensation components, circuits and techniques are utilized.

A prior art system for generating a wavelength stabilized output signal from an SLD which uses a multilayer dielectric interference filter inserted as one of the output coupling optics of a fully packaged SLD is described with reference to FIG. 1. The system shown in FIG. 1 includes a superluminescent diode 1, which generates an optical output signal S that is collimated by lens 2 and directed through a multilayer interference filter 3. The filtered optical signal S is focused by lens 4 whereupon it is injected into optical fiber lead 5. It is to be noted that in FIG. 1, the various optical mounts and alignment fixtures for supporting the optical components 1, 2, 3, 4, and 5 are not shown. However, it is to be understood that precision mounts and alignment fixtures are necessary to efficiently interface each of the optical components to one another. SLD 1 is designed and fabricated so that its output spectrum, shown schematically in FIG. 2, is somewhat larger than the transmittance passband of the interference filter, shown schematically in FIG. 3. The interference filter is ideally fabricated so that its passband is centered at the mean wavelength of the SLD emission for a specified target operating temperature. In addition, the materials used for the substrate of filter 3 and for the deposition of the filter layers should be chosen to have the lowest temperature coefficients of refractive index and expansion while still providing the appropriate indices of refraction to obtain the desired spectral transmittance. Under these conditions, the spectral properties, including the wavelength stability, of the combined SLD/filter source are determined primarily by the properties of the filter. In principle, as the temperature changes over the device operating range, the interference filter transmittance function will have a minimal shift in wavelength. The SLD spectrum may shift significantly for the same temperature change, but because the SLD spectrum is wider than the passband of the filter, the output signal remains centered at the center of the filter passband. For the multilayer interference filters to operate properly, a collimated input beam, derived from the SLD, must be incident on the filter. This requires that additional optical components, typically discrete micro-lenses, are used to collect and collimate the output of the SLD, and to focus the collimated light, which has passed through the filter into the single-mode fiber lead. Furthermore, the various components should be anti-reflection coated at the SLD mean wavelength to minimize optical feedback to the SLD. This is the same reason why the filter 3 is mounted at a non-normal angle with respect to the collimated beam S. Because this method requires that several discrete components be precisely aligned with respect to one another, precision mounting/alignment fixtures are required for the components.

The limitations and disadvantages of the above-described system for obtaining a wavelength stabilized SLD output are numerous. First, in order to obtain a sufficiently high transmission over a relatively broad spectral range, the possible choices of materials used to form the individual layers of the interference filter are limited to those whose indices of refraction are within a certain range. Therefore, the materials with the lowest thermal coefficients are in general not suitable for fabrication of the filter. A typical thermal response for the mean wavelength of a broadband ($\geq 10$ nm) high transmission (>85%) interference filter operating in the 1550 nm region is in the range 30–40 ppm/° C., which is an order of magnitude too large for IFOG applications. Secondly, the use of discrete optical components with their associated fixtures results in a fully packaged wavelength stabilized SLD that is relatively large and which requires a stable thermal and mechanical environment for proper operation. This means that the fully packaged SLD must include associated thermal and mechanical stabilization components and circuits, not only for the SLD semiconductor chip, but also for the discrete lenses, the filter, the fiber lead, and their associated mechanical mounts and alignment fixtures. Third, feedback power levels as small as 10 ppm can seriously degrade the power and wavelength stability of an SLD, and therefore reflected light feedback into the SLD must be minimized. Minimization of light feedback requires that all of the surfaces of the collimating and focusing optics and the fiber lead flat end face must be anti-reflection coated at the wavelength region of interest.

An example of the deleterious effects of reflection feedback into an SLD is shown in FIG. 4, which is the actual output spectrum of an SLD/interference filter combination operating in a wavelength region centered around 1510 nm. The feedback results in an asymmetric spectrum with significant ripple, characteristics, which seriously limit the applicability of such a source. Also, since the portion of the SLD spectrum rejected by the filter is actually reflected, extreme care must be taken to align the filter at an angle to the optical axis of the SLD output beam and the collimating and focusing optics. This requires that the passband center wavelength of the multilayer interference filter when it is operated at the offset angle, as opposed to normal incidence operation, match the center wavelength of the SLD emission spectrum. Matching the center wavelength of the SLD output emission imposes additional design and fabrication conditions upon the filter, which is normally fabricated while monitoring its optical properties at normal incidence. Furthermore, operating the filter at non-normal incidence will skew the transmission function of the filter, introducing asymmetries and structure that will reduce the effectiveness of the light source in several applications. Additionally, the power loss resulting from the transmission of the SLD output light through the various components can be significant, and therefore the effective optical power output of the packaged SLD is reduced. All of these special requirements imposed by the operation of the SLD with a discrete interference filter and the associated optical components result in a packaged SLD with degraded performance and reliability, especially in changing mechanical and thermal environments, and a more costly package.

A need, therefore, exists for a simple, cost-effective system, which generates a wavelength-stabilized output from a superluminescent diode with respect to temperature that does not require expensive and bulky optical components and mounting and alignment fixtures.

SUMMARY OF THE INVENTION

The present invention provides a system for generating a filtered "broadband" light output from a superluminescent diode (SLD) emitter, such that the output has a generally stable spectral shape and mean wavelength over a wide temperature range. By broadband it is generally meant that the output spectrum, when measured as the full width at half maximum (FWHM) of the power spectrum, preferably may be in the range of about 10 to 30 nanometers (nm). The phrase "wavelength stable" means that the mean optical wavelength $\bar{\lambda}$ varies with temperature T by less than or equal to 10 parts per million per degree Celsius (ppm/° C.), that is $$\frac{1}{\bar{\lambda}} \frac{\Delta \bar{\lambda}}{\Delta T} \leq 10^{-5} \frac{1}{°C.}$$

The mean wavelength is defined by the equation:

$$\bar{\lambda} = \frac{\int \lambda P(\lambda) d\lambda}{\int P(\lambda) d\lambda}$$

where $\lambda$ is the wavelength of light, and P ($\lambda$) is the optical power as a function of $\lambda$, that is, the spectral distribution of the light signal. The range of integration is understood to be large enough to include all non-zero values of P ($\lambda$).

The invention may be implemented whereby a superluminescent diode injects an optical signal into a conically tapered optical fiber fusion spliced to an optical fiber polarization independent wavelength division multiplexing (PINC WDM) coupler. The PINC WDM coupler transforms the optical signal into a wavelength stabilized optical signal with respect to temperature.

One advantage of the invention is that it provides wavelength stabilization (WS) of the output of a superluminescent diode while achieving high efficiency coupling of the SLD output to a single-mode optical fiber lead.

Another advantage of the invention is that it transforms the output of a superluminescent diode into a broadband optical signal with high coupling efficiency with a minimum number of optical components and associated mounting and alignment devices.

These and other advantages of the invention will become more apparent upon review of the following specification, including the claims, and the drawings.

DESCRIPTION OF THE PREFERRED EMBODIMENTS

Figure 5:
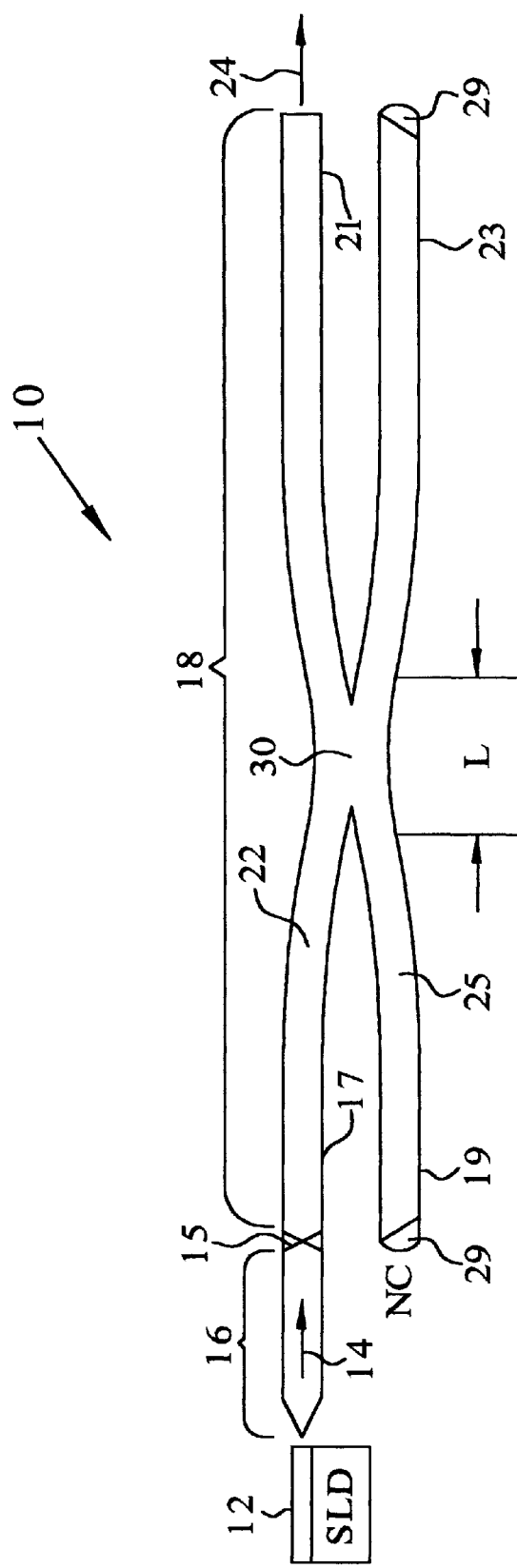
FIG. 5 schematically represents a system for generating a wavelength-stabilized output from a superluminescent diode embodying various features of the present invention.

Referring to FIG. 5, the present invention provides a system 10 having an optical output signal 14 generated by superluminescent diode (SLD) that is wavelength stabilized with respect to temperature. System 10 includes a superluminescent diode 12 which emits an optical signal 14 that is injected into conically tapered optical fiber 16 that is fusion spliced to lead 17 of polarization independent narrow channel wavelength division multiplexer coupler ("PINC WDM") 18 at region 15. PINC WDM coupler 18 further includes leads 19, 21, and 23. Leads 19 and 23 are terminated at an angle and coated with an index matching epoxy so that any optical energy which might propagate in leads 19 and 23 does not reflect at the terminated ends of leads 19 and 23 and reflect back into leads 17 and/or 21. Signal 14 is transformed by PINC WDM 18 into a filtered optical output signal 24 that is emitted from lead 21. PINC WDM 18 is preferably of the type described to commonly assigned U.S. Pat. No. 5,121,453, incorporated herein by reference.

Figure 9:
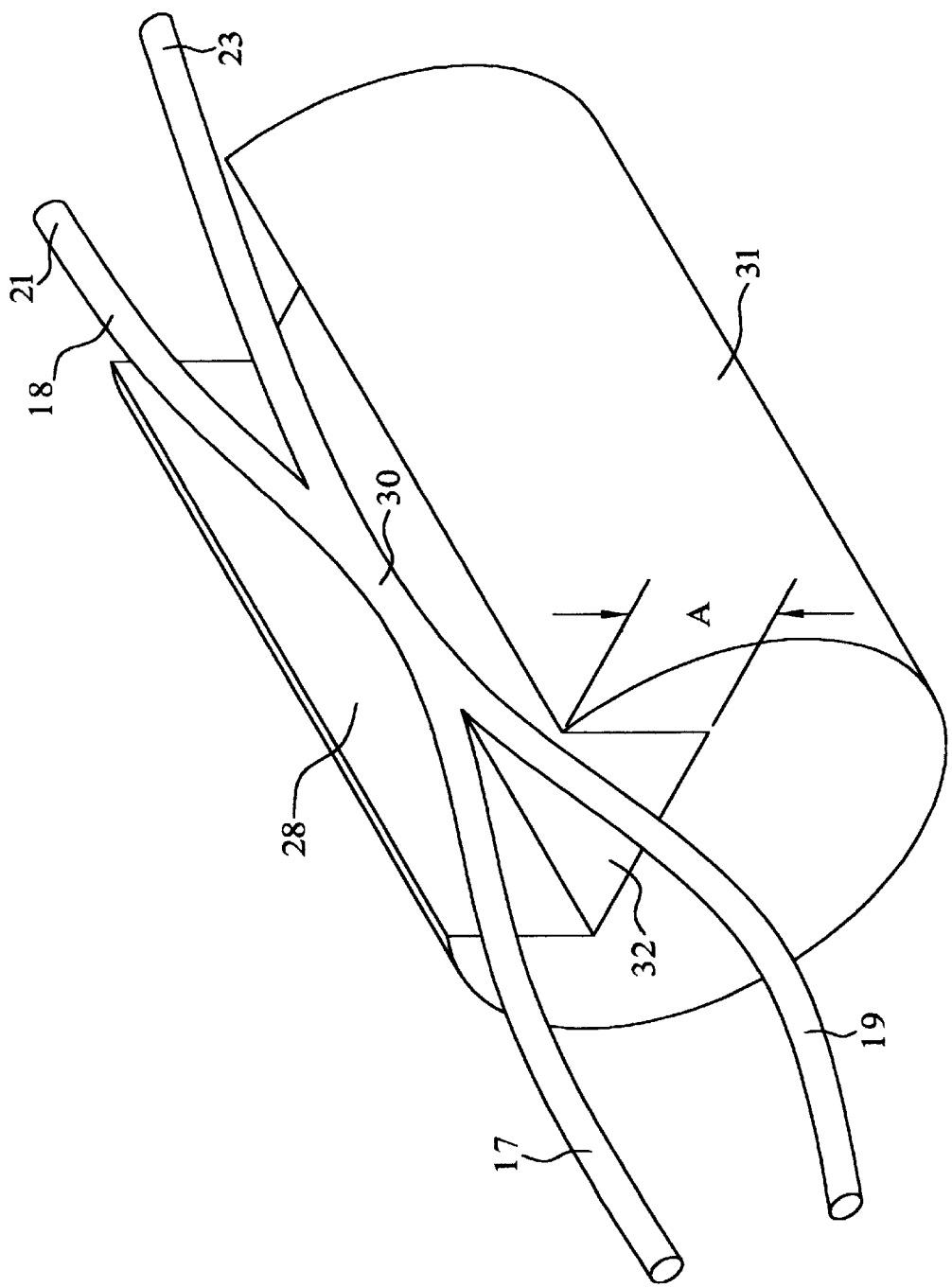
FIG. 9 shows PINC WDM 18 of FIG. 5 supported within the groove of a cylindrically shaped supporting substrate.
Figure 10:
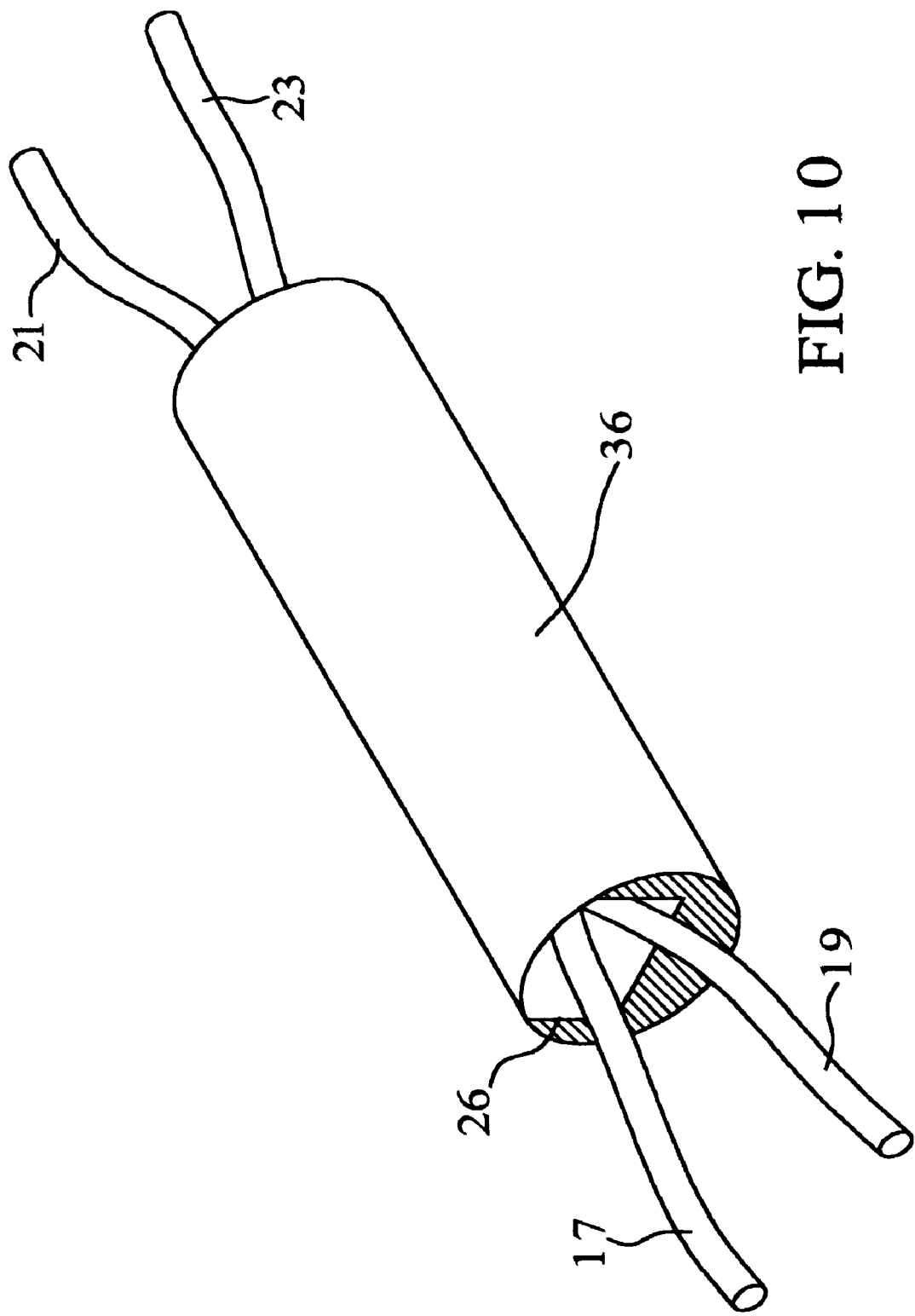
FIG. 10 shows the cylinder of FIG. 7 supported and sealed within a protective tube.

In general, PINC WDM 18 comprises two single mode optical fibers 22 and 25 which have been fused together over a certain length, L, and then tapered and elongated to form a fused region 30. Referring to FIG. 9, PINC WDM 18 may be mounted to a substrate 31 preferably made of silica. Silica is a preferred material for the substrate 31 because PINC WDM 18 is generally made of silica; therefore, the substrate and PINC WDM 18 have substantially identical thermal properties. Substrate 31 may be implemented in the form of a cylinder having a groove 28, whereby PINC WDM 18 is held within groove 28 with dollops of epoxy, not shown, which support leads 17, 19, 21, and 23 so that the fused region 30 is suspended above the base 32 of groove 28 by a finite distance, A, where A, may be in the range of a few tens of microns or more. As shown in FIG. 10, substrate 26 and PINC WDM coupler 18 (FIG. 5) may be inserted into and supported by tube 36, which may be made of stainless steel. Adhesive materials, such as RTV material or epoxy, not shown, may be applied to each exposed end of cylinder 36 to hold the cylinder in place within tube 36. With reference to both FIGS. 5 and 10, the purpose of tube 36 is to protect fused region 30 of PINC WDM coupler 18 from physical damage.

Conically tapered optical fiber 16 efficiently couples the optical signal 14 from superluminescent diode 12 into PINC WDM 18 with high efficiency on the order of about 50 percent and with minimal back reflection. An important advantage of PINC WDM 18 is that it has very low excess loss (<0.2 dB), provides channel wavelength separations between 4 nm and 40 nm, and exhibits isolation better than −20 dB. Furthermore PINC WDM 18 operates with minimal dependence on the polarization state of optical signal 14.

Figure 6:
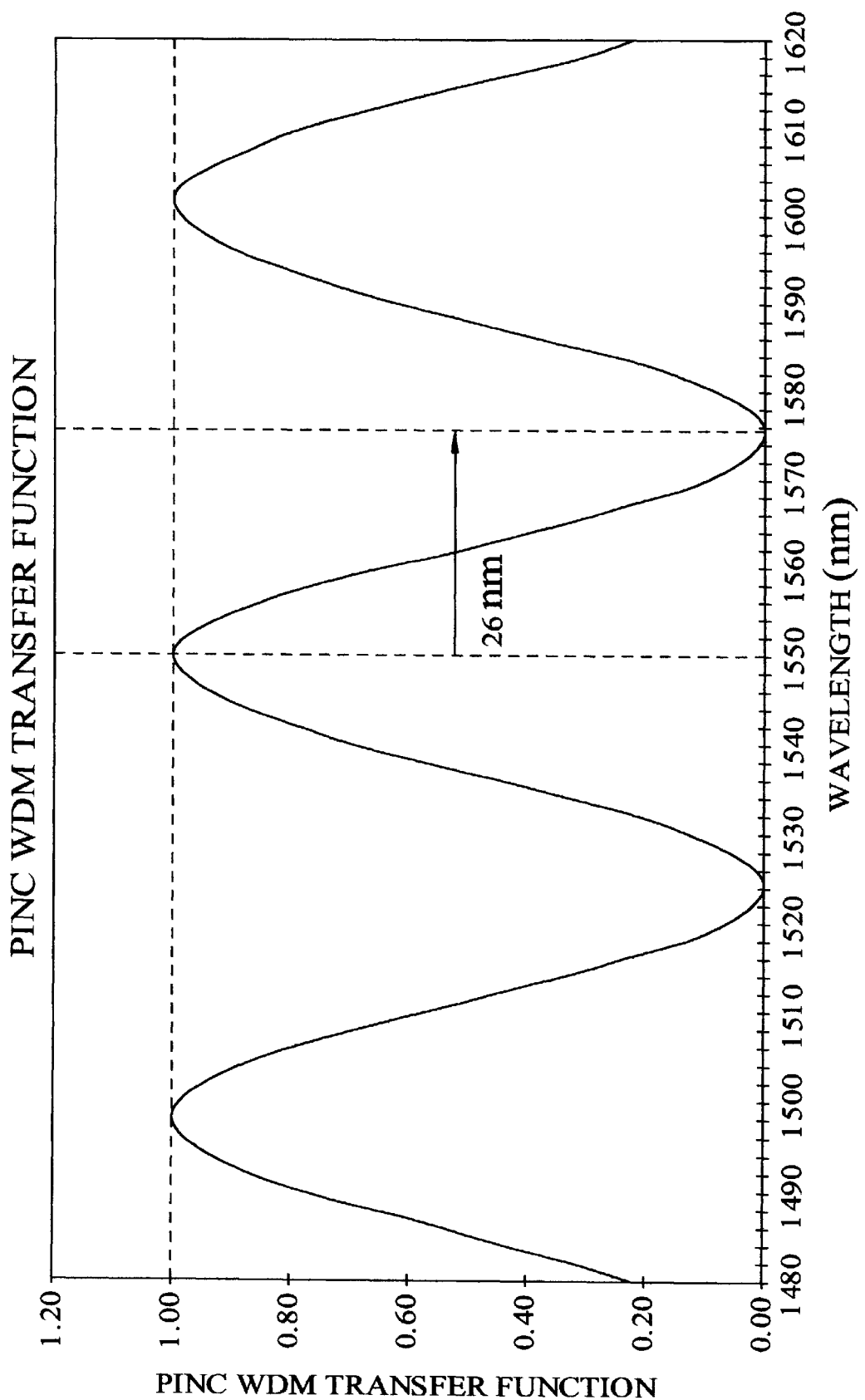
FIG. 6 illustrates an example of the transfer function of a PINC WDM of the type shown in FIG. 5.

PINC WDM 18 coupler exhibits a wavelength transfer function $T_c(\lambda)$, that is, an optical spectrum at one of the output ports for a white light input of unit spectral power density, which can be represented by a raised sinusoidal function $$T_c(\lambda)=\frac{1}{2}[1+\cos\{\pi(\lambda-\lambda_0)/\Delta\lambda)\}]$$

where $\lambda$ is the wavelength of light, $\lambda_0$ is a particular wavelength for which the power transmission is a maximum, $\Delta\lambda$ is one half the period of the transfer function and is also equal to the WDM channel spacing and to the full width at half maximum of the transfer function. The values of $\lambda_0$ and $\lambda_0+\Delta\lambda$ are the channel wavelengths. FIG. 6 shows a representation of the transfer function of PINC WDM 18 which is designed for operation in the 1550 nm region with a 26 nm channel spacing.

Figure 1:
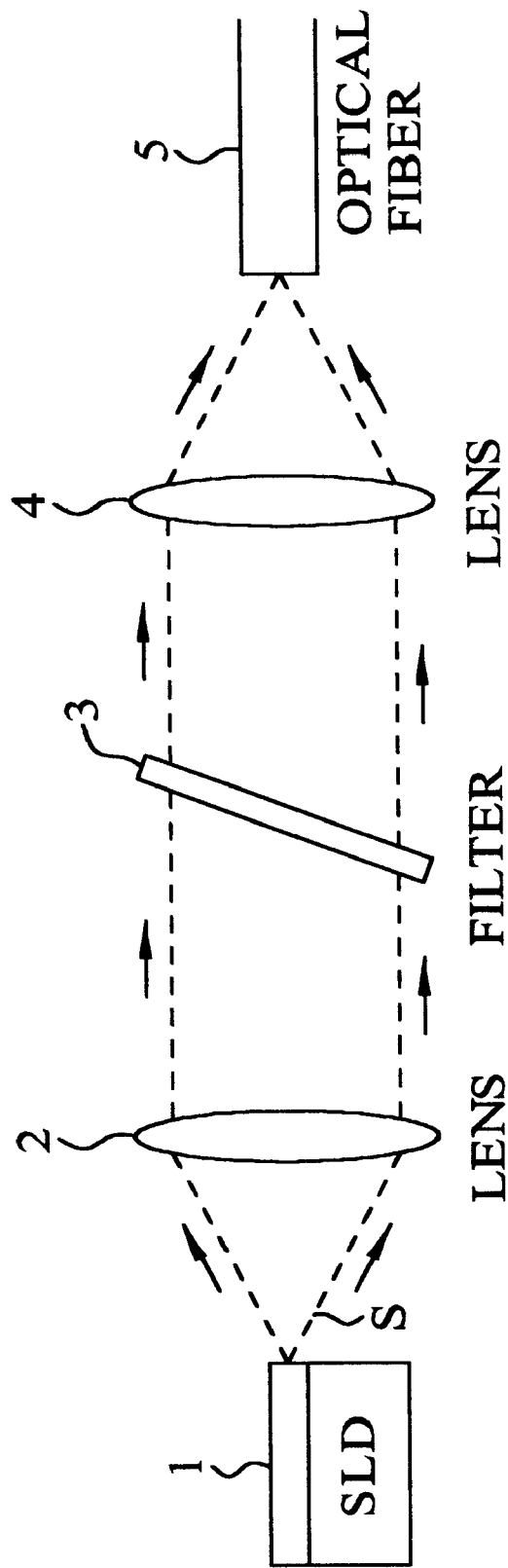
FIG. 1 shows a prior art system for filtering the output spectrum of a superluminescent diode, which then is coupled in to a single mode optical fiber.
Figure 2:
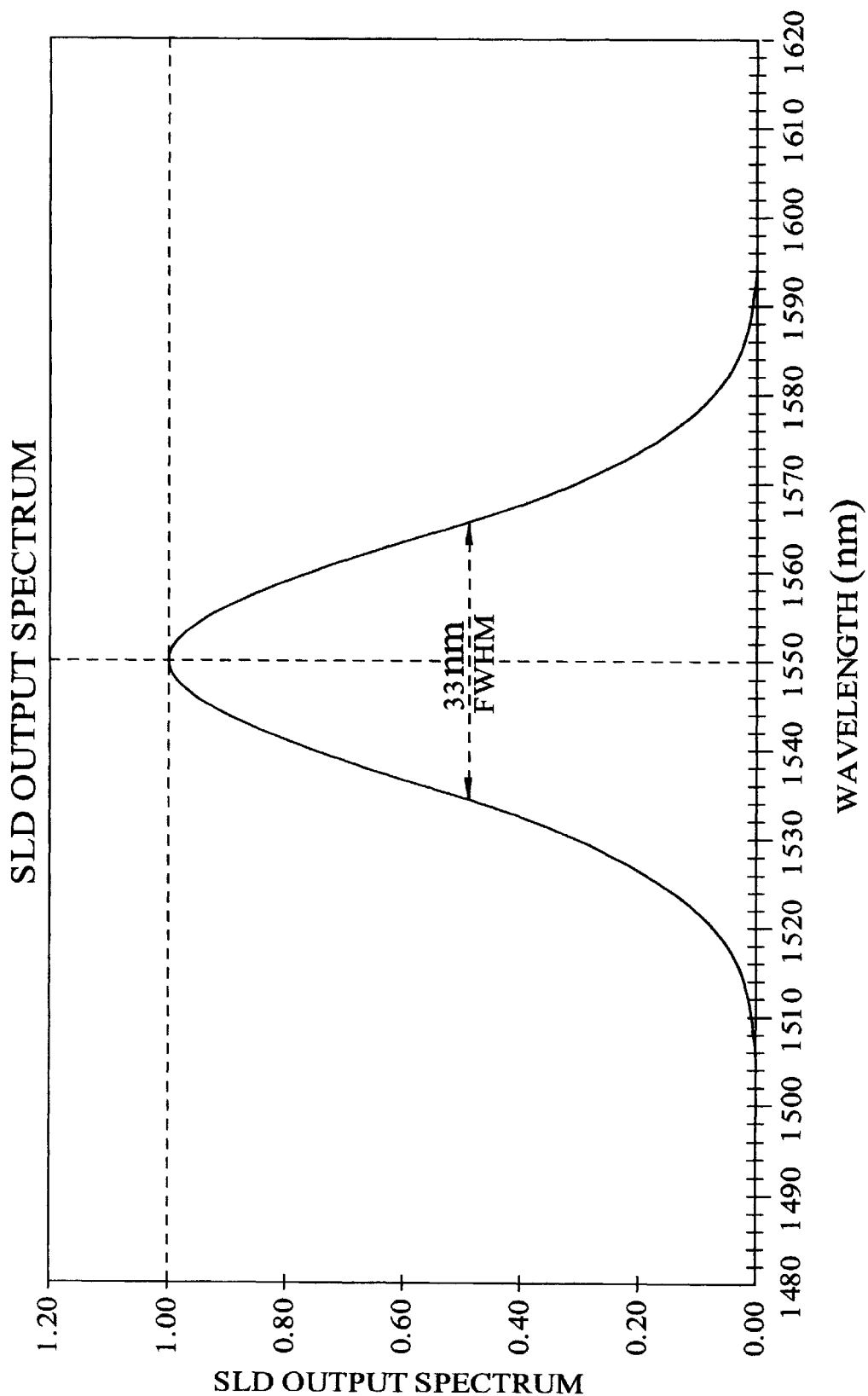
FIG. 2 is a schematic representation of an idealized Gaussian superluminescent output spectrum centered at 1550 nm and having a full width, half maximum (FWHM) of approximately 33 nm.
Figure 3:
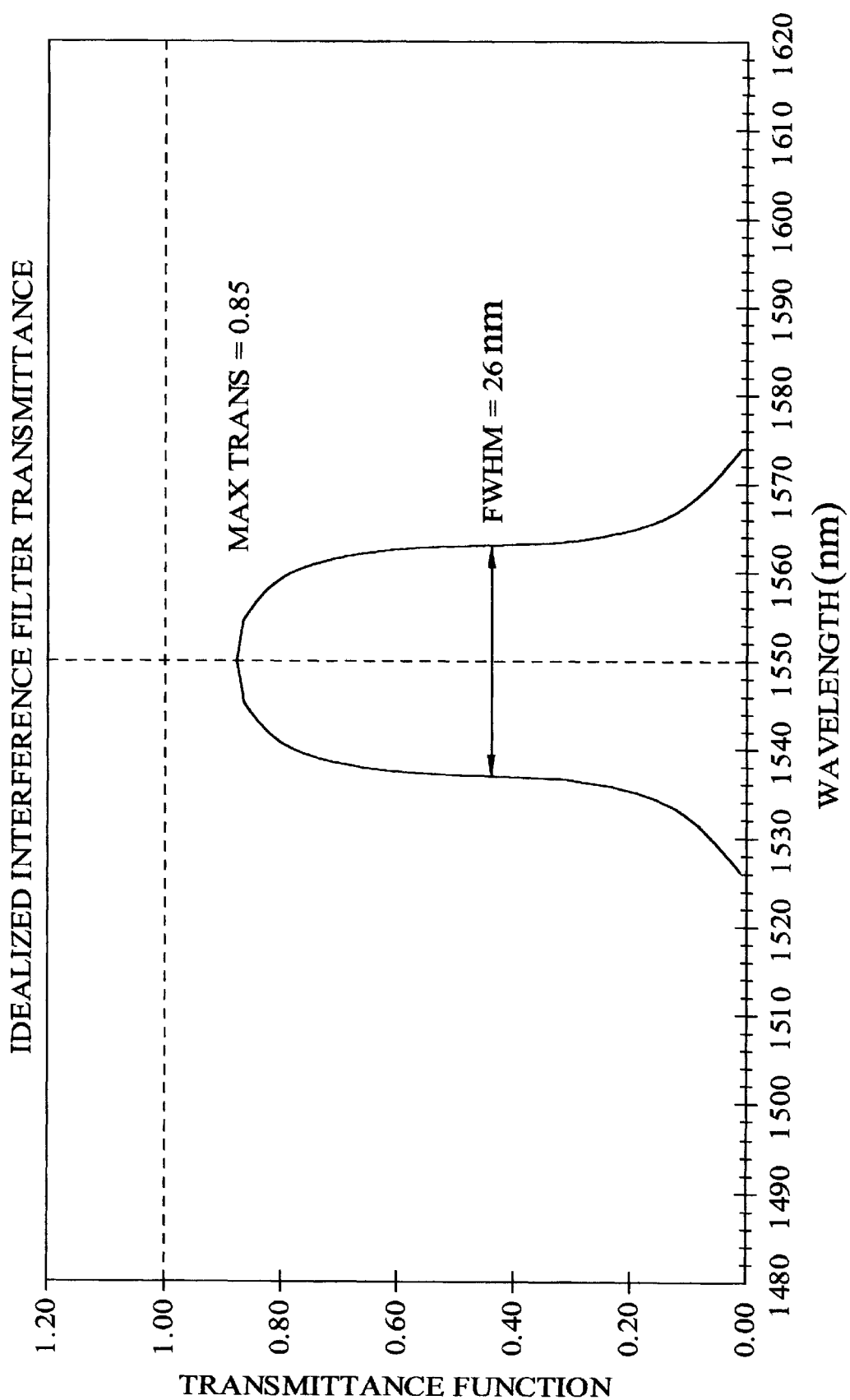
FIG. 3 shows an idealized interference filter transmittance function having a passband centered at 1550 nm, a FWHM of 26 nm, and a peak transmittance of 0.85.
Figure 4:
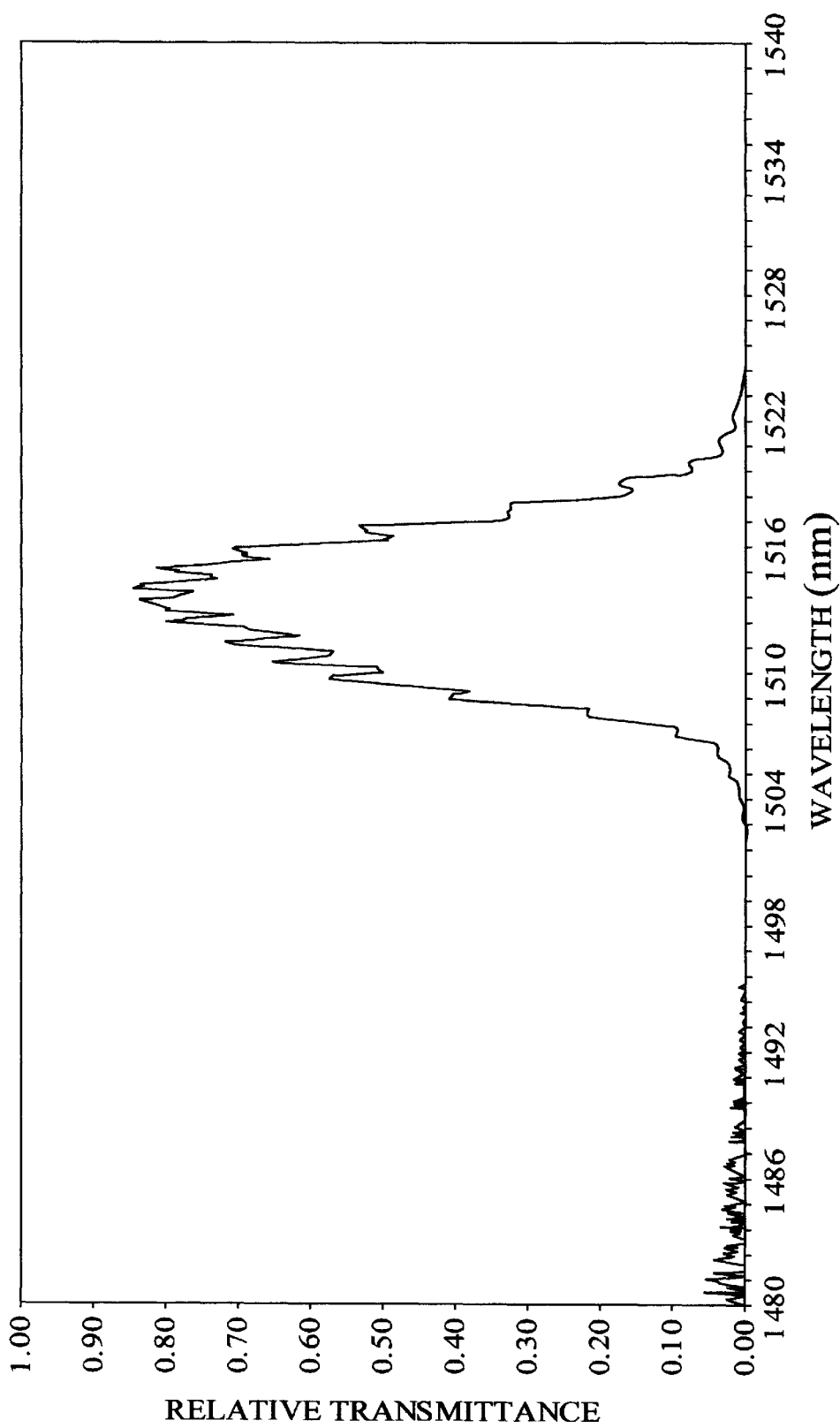
FIG. 4 represents the actual output spectrum of a superluminescent diode interference filter combination designed to operate in the 1510 nm region.

Recently, researchers at the Sarnoff Corporation have developed SLDs operating in the 1550 nm region with emission spectra exhibiting spectral widths of approximately 35 nm FWHM. Referring to FIG. 2, the normalized output spectrum of such an SLD can be represented by a Gaussian function of the form $$P(\lambda)=(P_0/\delta\lambda)\exp[-\pi(\lambda-\lambda_s)^2/(\delta\lambda)^2],$$

where $P_0$ is the total optical power of the source, $\lambda_s$ is the wavelength of maximum output power for a specified nominal operating temperature, and $\delta\lambda$ is a measure of the spectral width of the SLD ($\delta\lambda$ is approximately equal to the full width at half maximum of the power spectrum).

Figure 7:
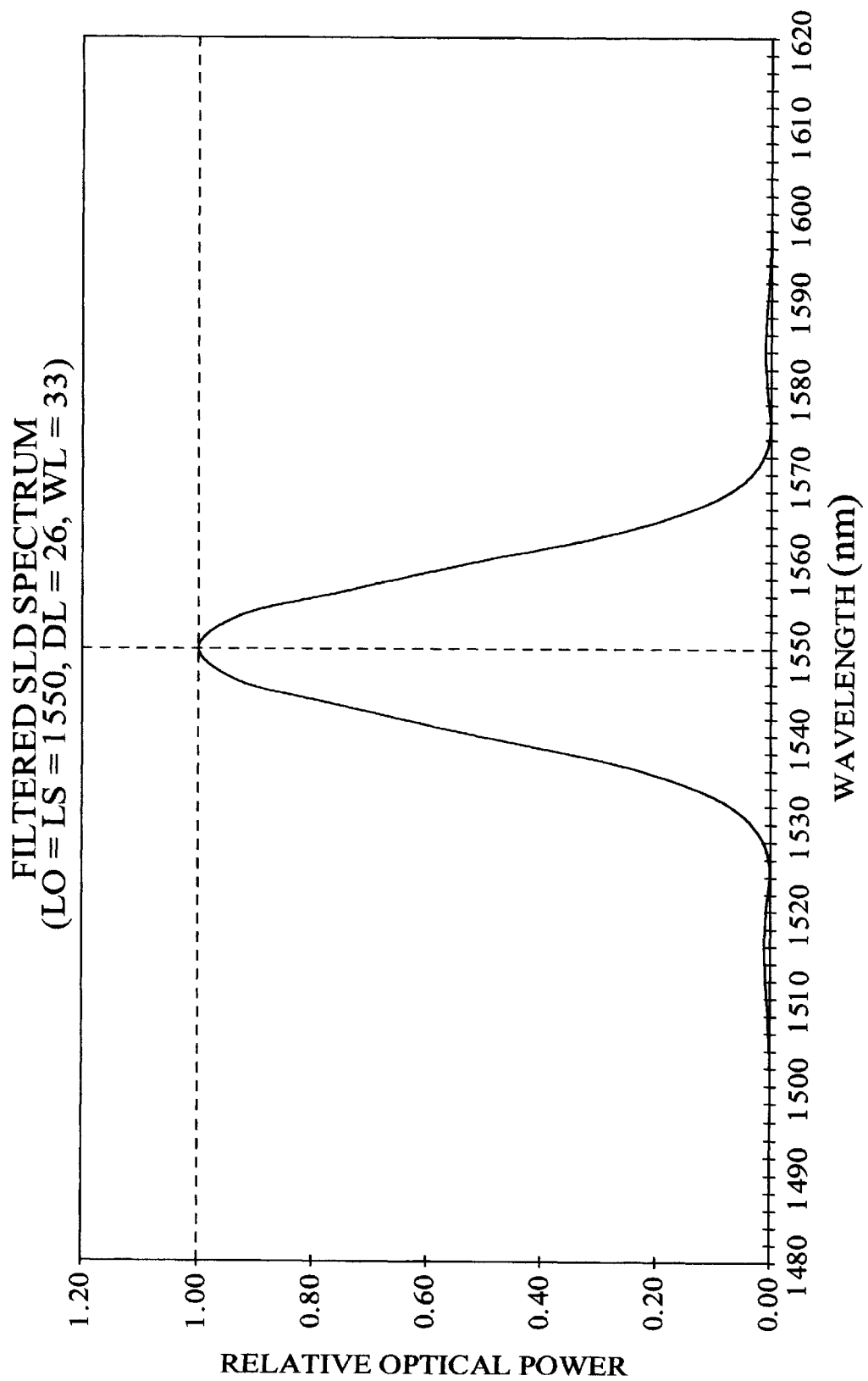
FIG. 7 represents a linear plot of an idealized filtered output spectrum for an example of a system for generating a wavelength stabilized output from a superluminescent diode of the type shown in FIG. 5.
Figure 8:
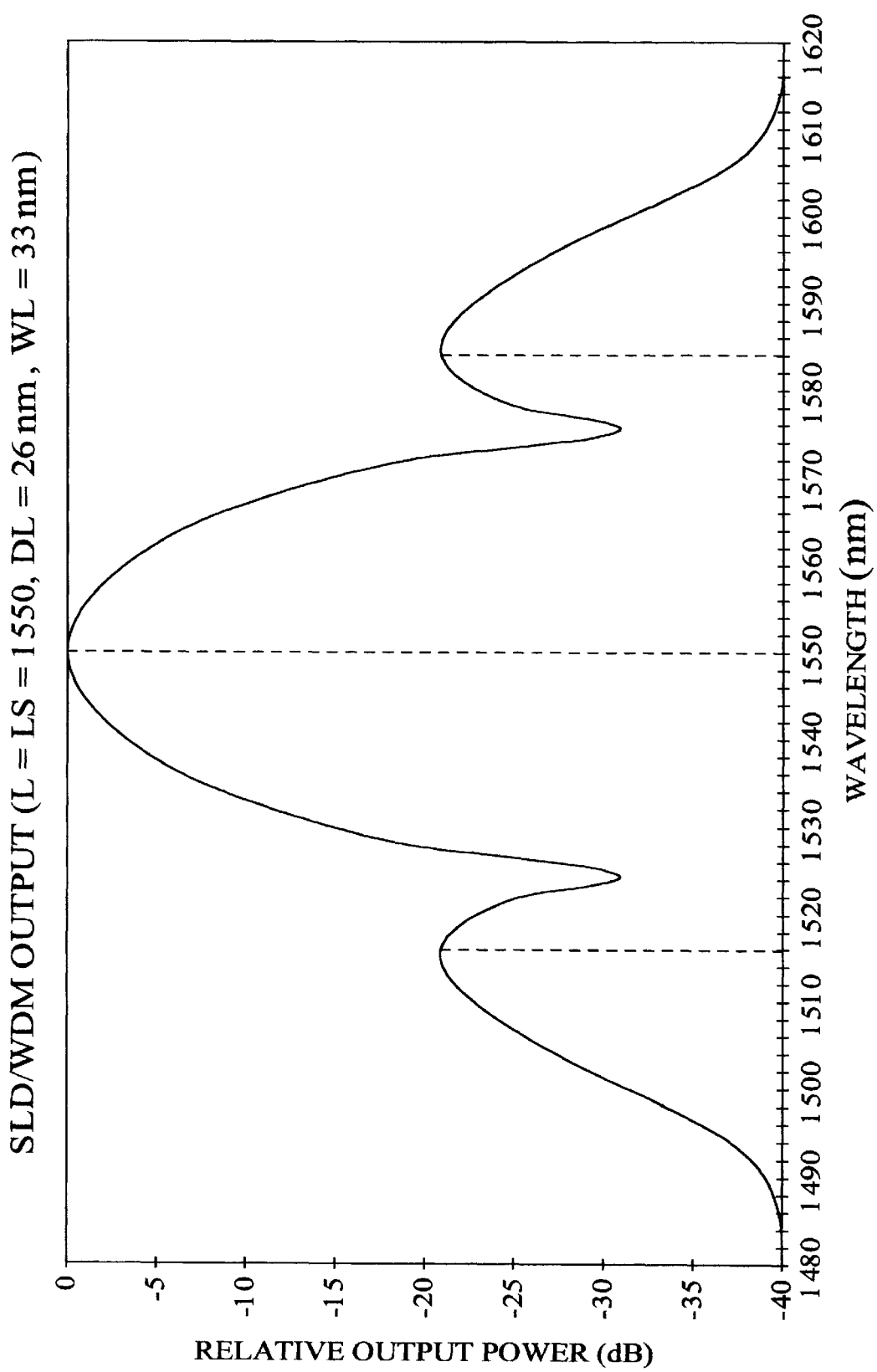
FIG. 8 is a log plot of the idealized filtered SLD spectrum shown in FIG. 7.

For the PINC WDM to function as a wavelength stabilized filter for such an SLD, and to have a throughput power spectrum with secondary peaks that are less than 1% (<−20 dB) of the main peak, the channel wavelength $\lambda_0$ preferably is chosen to match the wavelength $\lambda_s$, and $\Delta\lambda$ is chosen to be slightly less than $\delta\lambda$. FIGS. 7 and 8 show the filtered output spectrum, that is the SLD output after passing through the PINC WDM and exiting one of the output leads, for the case where $\lambda_s\lambda_0$=1550 nm, $\Delta\lambda_s$=33 nm, and $\Delta\lambda$=26 nm. It should be noted that many other possible values of the PINC WDM and SLD spectral parameters would also yield a stabilized filtered source spectrum. The choice of the exact values will depend upon the requirements imposed by the particular application.

Figure 11:
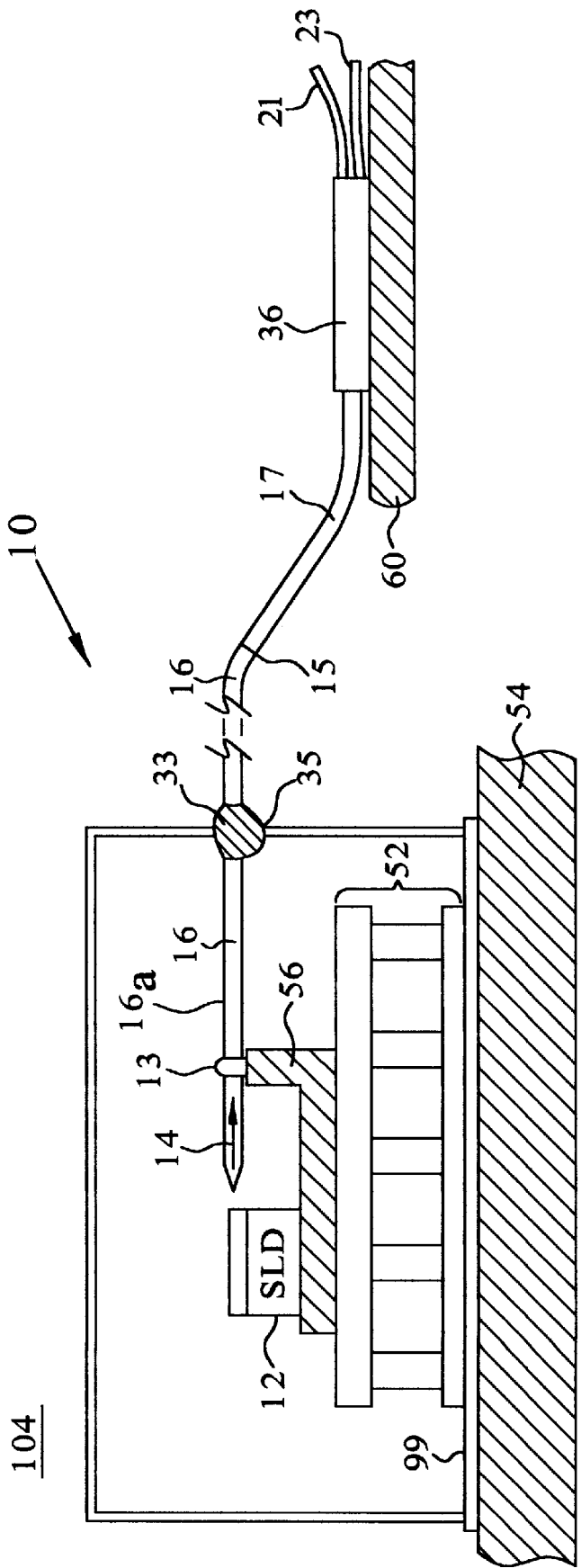
FIG. 11 shows a system for generating a wavelength stabilized output from a superluminescent diode and a PINC WDM coupler which employees thermoelectric temperature control.

FIG. 11 shows an example of a particular implementation of the system 10 whereby SLD 12 and conically tapered optical fiber 16 are mounted to a support structure 56 so that optical signal 14 may be injected into optical fiber 16. By way of example, optical fiber 16 may have a metalized outer coating 16a and be fastened to support structure 56 by a bead 13 of solder or epoxy. Support structure 56 preferably has a high thermal conductivity and may be attached to thermoelectric cooler 52 for regulating the temperature of SLD 12. In the preferred embodiment, thermoelectric cooler 52 may work on the principal of the Peltier effect. Such thermoelectric cooler are commercially available, as for example, from ILX Lightwave in Bozeman, Mont. Thermoelectric cooler 52 may be attached to package base 99, which in turn is mounted to heat sink 54 by any suitable method, such as by the use of mechanical fasteners, not shown, solder, or epoxy, so that there is good thermal conductivity between thermoelectric cooler 52 and the heat sink 54. An enclosure 100 covers SLD 12, conically tapered optical fiber 16, and thermoelectric cooler 52 and protects them from the external environment 104. Conically tapered optical fiber 16 extends through aperture 35 in enclosure 100 which may be sealed with a bead 33 of epoxy. In the preferred embodiment, fusion splice 15 may be a convenient length, such as 10 cm or more, from the tip of tapered optical fiber 16. A suitable length of lead 17 of PINC WDM coupler 18 (mounted in cylinder 31) may be fusion spliced to conically tapered optical fiber 16.

Preferably, heat sink 54 has much greater mass than that of thermoelectric cooler 52 so that heat sink 54 effectively conducts away heat generated by SLD 12. Cylinder 31 is mounted with good thermal contact to heat sink 60, using for example, a thermally conductive epoxy, to provide passive temperature control for WDM coupler 18 as a result of the large mass of substrate 60 compared to that of cylinder 31. Although shown and described as two separate elements, in some embodiments of the invention, heat sinks 54 and 60 may actually be separate regions of one structure.

Figure 12:
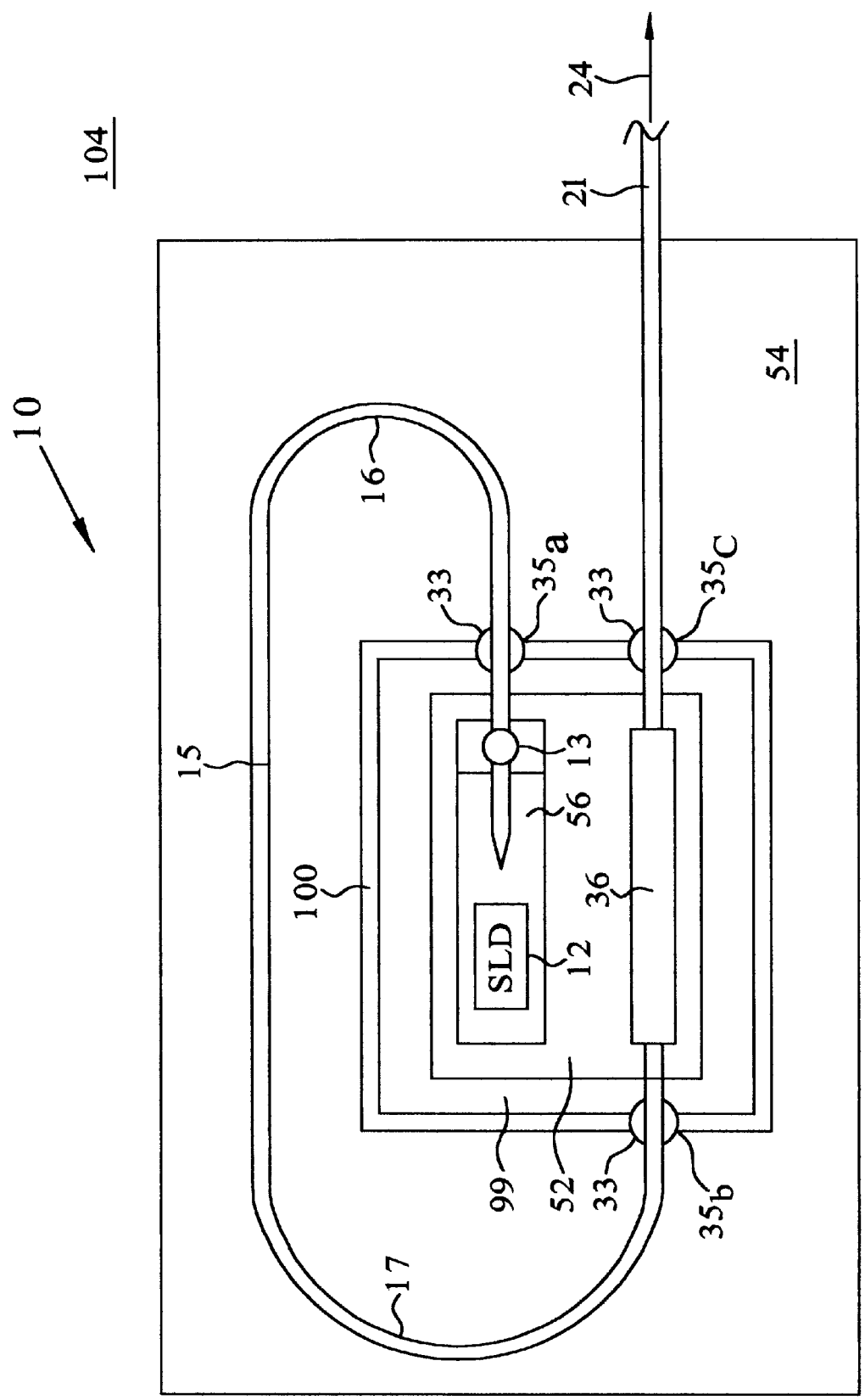
FIG. 12 shows a system for generating a wavelength stabilized output from a superluminescent diode and a PINC WDM coupler which employees thermoelectric temperature control to control the temperature of the superluminescent diode and the PINC WDM coupler.

FIG. 12 illustrates an embodiment of the invention whereby PINC WDM 18 (FIGS. 5 and 9) mounted within tube 36 is positioned within enclosure 100 so that both PINC WDM 18 and SLD 12 are actively temperature controlled by thermoelectric cooler 52. In FIG. 12, conically tapered optical fiber 16 feeds through hole 35a of enclosure 100, and is fused at region 15 to lead 17 of PINC WDM 18. Lead 17 wraps around and enters enclosure 100 through aperture 35b in enclosure 100. Lead 21 of PINC WDM 18, shown extending from tube 36, feeds through aperture 35c of enclosure 100 for connecting PINC WDM 18 to an optical system, not shown. An important advantage of temperature regulating both SLD 12 and PINC WDM 18 with thermoelectric cooler 52 is to enhance the wavelength stabilization of output signal 14. Apertures 35a, 35b, and 35c may be sealed with epoxy 33.

PINC WDM 18 acts as an effective wavelength filter for matched SLD 12, i.e., where $\lambda_o=\lambda_s$, where $\lambda_o$ and $\lambda_s$ have been defined herein above. The advantage of this type of filter is that PINC WDM 18 has a thermal expansion coefficient and refractive index coefficient equal to that of the fused silica glass, which composes both PINC WDM 18 and substrate 26 upon which, PINC WDM 18 is mounted. This combination of elements provides a "filter" having a spectral transfer function with a thermal sensitivity of only 6 ppm/° C. With proper thermal management of the coupler environment, as shown in FIGS. 11 and 12, system 10 is expected to exhibit a thermal sensitivity of less than 1 ppm/C, which is entirely sufficient for use in exacting applications such as a low coherence, high power light source for navigation grade IFOGs. In addition to providing wavelength stabilization, PINC WDM 18 filter operates without introducing any of the deleterious effects on light source performance, as does the interference filter.

Specifically, since there are no planar optical surfaces along the optical path of system 10, which would result in a reflection of SLD signal 14 back into SLD 12, the spectrum will be smooth and symmetric. Also, the portion of the light signal which is not transmitted by PINC WDM 18 is not reflected as in the interference filter, but instead is coupled out the unused output port 23 of WDM 18. This further reduces the possibility of any feedback of the optical signal 14 into SLD 12. Another significant advantage of system 10 is that there is no need for any optical and/or mechanical alignment devices of any kind, except for the conically shaped or tapered optical fiber 16 which is aligned with SLD 12, since the optical elements of system 10 almost entirely consist of continuous optical fiber. Note that because the diameter of optical fiber 16 is small (~125 microns), a permanent and rigid interface between optical fiber 16 and SLD 12 may be achieved by epoxying or soldering fiber 16 and SLD 12 on to a common substrate or submount which may then be mounted on a thermoelectric cooler as described above with reference to FIG. 11. In this way, the only critical and sensitive connection is maintained in a constant thermal/mechanical condition. Another important advantage of system 10 is that because there is only one optical coupling, between SLD 12 and tapered optical fiber 16, and because PINC WDM 18 is a very low loss device, the optical power output of system 10 is substantially greater than it would otherwise be from prior art systems. Another advantage of system 10 is that because the length of fiber comprising tapered optical fiber 16 between SLD 12 package and PINC WDM 18 is not critical, this length of fiber can be some convenient length which allows for ease of packaging SLD 12 package and PINC WDM 18 package in a small thermally and mechanically controlled configuration compatible with the overall optical system in which system 10 is used, as for example, an IFOG. Another advantage of system 10 is that it is a significantly less costly method of achieving a wavelength stabilized light source using the output of an SLD. This advantage results from the fact that there are a minimal number of components and there is no need to align and configure the components, except at the SLD conically tapered fiber interface. Further, system 10 does not require the use of any special anti-reflection coatings as in prior art systems.

Figure 13:
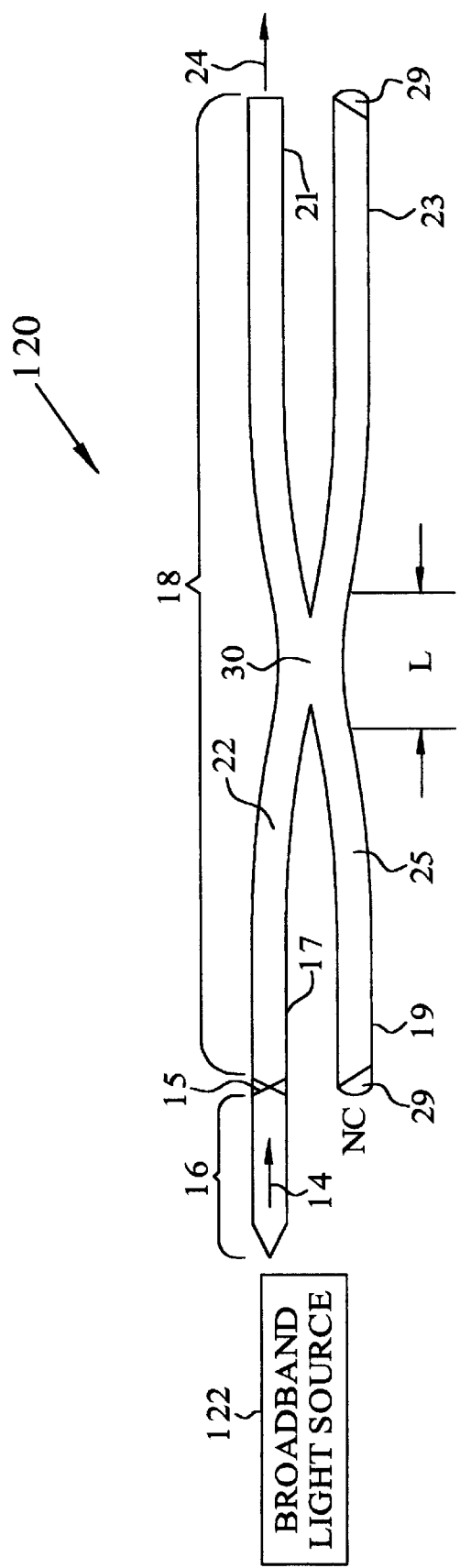
FIG. 13 shows another embodiment of the invention which includes a broadband light source having an output coupled to a PINC WDM coupler.

Although the invention has been described as including a superluminescent diode as an optical energy source, the scope of the invention further includes the use of any broadband optical energy source. A broadband optical energy source is one which generates optical energy having a spectral bandwidth of about 10 nm or more. In FIG. 13, there is shown another embodiment of the invention which provides a system 120 for generating a wavelength stablized optical output from a broadband optical energy source 122. Broadband optical energy source 122 generates a broadband optical signal 14 that is injected into conically tapered optical fiber 16 that is fusion spliced at region 15 to lead 17 of PINC WDM coupler 18, as described above. PINC WDM coupler 18 transforms optical signal 14 into wavelength stablized optical signal 24. Examples of broadband optical energy sources include super radiant diodes, light emitting diodes, and rare earth doped fiber light sources.

Obviously, many modifications and variations of the present invention are possible in light of the above teachings. It is therefore to be understood that within the scope of the appended claims, the invention may be practiced otherwise than as specifically described.

I claim:

1. A system for generating a wavelength stabilized output from a superluminescent diode, comprising, a superluminescent diode for generating an optical signal having a generally Gaussian waveform characterized by a first full width, half maximum value, $FWHM_1$;

a conically tapered optical fiber for receiving said optical signal; and an optical fiber polarization independent wavelength division muliplexing coupler for outputting a filtered optical signal in response to receiving said optical signal from said conically tapered optical fiber, where said filtered optical signal is characterized by a second full width, half maximum value, $FWHM_2$, and $FWHM_1 > FWHM_2$.

2. The system of claim 1 wherein said optical fiber polarization independent wavelength division muliplexing coupler has first, second, third, and fourth leads, and said first lead is fusion spliced to said conically tapered optical fiber.

3. The system of claim 2 wherein said second and third leads of said optical fiber polarization independent wavelength division muliplexing coupler are terminated for attenuating back reflections within said coupler.

4. The system of claim 1 wherein said optical fiber polarization independent wavelength division muliplexing coupler is mounted to a substrate.

5. The system of claim 4 wherein said substrate consists essentially of fused silica.

6. The system of claim 4 wherein said optical fiber polarization independent wavelength division muliplexing coupler and substrate are mounted in a tube.

7. The system of claim 6 wherein said tube consists essentially of stainless steel.

8. The system of claim 1 further including a thermoelectric cooler for controlling the temperature of said superluminescent diode.

9. The system of claim 8 wherein said thermoelectric system is mounted to a substrate for providing said thermoelectric system with a heat sink.

10. The system of claim 1 further including a thermoelectric cooler for controlling the temperature of said superluminescent diode and said coupler.

11. The system of claim 1 wherein said coupler is fusion spliced to said conically tapered optical fiber.

12. A system for generating a wavelength stabilized output from a superluminescent diode, comprising, a superluminescent diode for generating an optical signal;

a conically tapered first optical fiber for receiving said optical signal; and an optical fiber polarization independent wavelength division muliplexing coupler fusion spliced to said conically tapered first optical fiber, for outputting a filtered optical signal in response to receiving said optical signal from said optical fiber, said coupler including:

a second optical fiber; and a third optical fiber fusion welded to said second optical fiber, whereby said coupler has a channel cross-talk of less than −20 db within 1 nm of a first wavelength of randomly polarized light injected into said second optical fiber, and within 1 nm of a second wavelength of randomly polarized light injected into said third optical fiber, and said coupler has a wavelength spacing $\leq 35$ nm.

13. A system for generating a wavelength stabilized output from a superluminescent diode, comprising, a superluminescent diode for generating an optical signal having a generally Gaussian waveform characterized by a first full width, half maximum value, $FWHM_1$;

a conically tapered optical fiber for receiving said optical signal; and an optical fiber polarization independent wavelength division muliplexing coupler for outputting a filtered optical signal in response to receiving said optical signal from said conically tapered optical fiber, where said filtered optical signal is characterized by a second full width, half maximum value, $FWHM_2$, and $FWHM_1 > FWHM_2$; and a thermoelectric cooler for controlling the temperature of said superluminescent diode.

14. The system of claim 13 further including an enclosure in which said superluminescent diode and said thermoelectric cooler are mounted.

15. The system of claim 13 further including an enclosure in which said superluminescent diode and said coupler are mounted.

16. The system of claim 13 wherein said coupler is mounted in thermal contact with said thermoelectric cooler.

17. A system for generating a wavelength stabilized output from a broadband optical energy source, comprising, a broadband optical energy source for generating an optical signal having a generally Gaussian waveform characterized by a first full width, half maximum value, $FWHM_1$, and a spectral width of at least 10 nanometers;

a conically tapered optical fiber for receiving said optical signal; and an optical fiber polarization independent wavelength division muliplexing coupler for outputting a filtered optical signal in response to receiving said optical signal from said conically tapered optical fiber, where said filtered output signal is characterized by a second full width, half maximum value, $FWHM_2$, and $FWHM_1 > FWHM_2$.

18. The system of claim 17 wherein said broadband optical energy source is selected from the group that includes super radiant diodes, light emitting diodes, superluminescent diodes, and rare earth doped fiber light sources.

* * * * *